(No Model.)
J. E. SHARP.
PIE LIFTER.
No. 535,629. Patented Mar. 12, 1895.
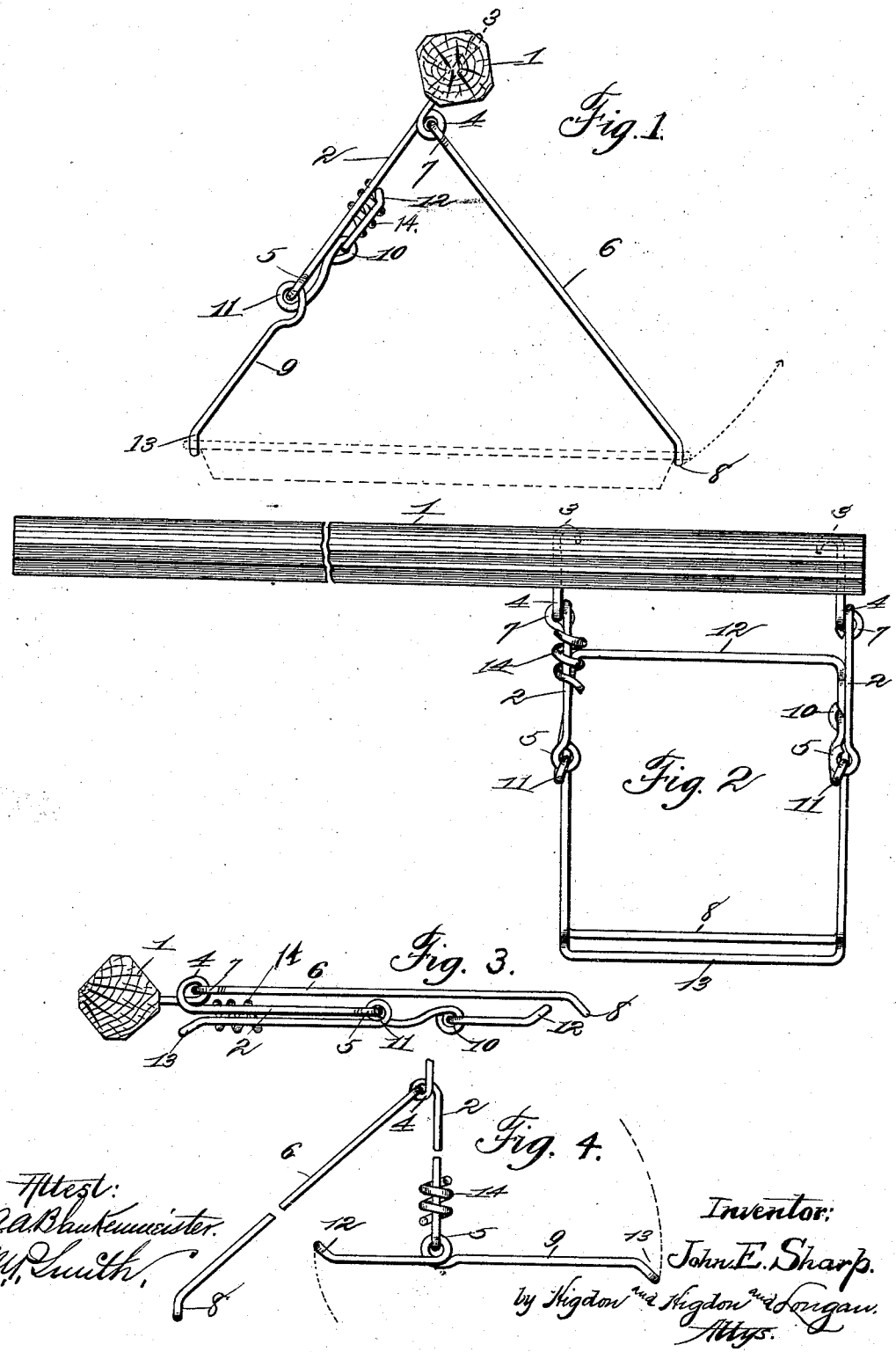

UNITED STATES PATENT OFFICE.

JOHN E. SHARP, OF ST. LOUIS, MISSOURI, ASSIGNOR OF TWO-THIRDS TO SAMUEL C. RICHARDS AND CHARLES B. BOYD, OF SAME PLACE.

PIE-LIFTER.

SPECIFICATION forming part of Letters Patent No. 535,629, dated March 12, 1895.

Application filed December 10, 1894. Serial No. 531,405. (No model.)

*To all whom it may concern:*

Be it known that I, JOHN E. SHARP, of the city of St. Louis and State of Missouri, have invented certain new and useful Improvements in Pie-Lifters, of which the following is a full, clear, and exact description, reference being had to the accompanying drawings, forming a part hereof.

My invention relates to a pie lifter, the object of my invention being to construct a simple, inexpensive and efficient device for removing pie-pans and cooking utensils of a similar character from stove-ovens and the tops of stoves.

My invention consists in a handle, upon the end of which is mounted a stationary arm or member, from and to which is swung and pivoted the arms or members that engage the rim or flange of the cooking utensil or other device that is to be lifted or removed.

In the drawings: Figure 1 is an end elevation of my improved device, a pie-pan being shown in dotted lines as being lifted and carried by said device. Fig. 2 is a side elevation of a lifter constructed in accordance with my invention. Fig. 3 is an end elevation of the preferred form of my device, the same being in a closed position. Fig. 4 is an end elevation of the pivoted arms of the lifter, one of which is adapted to be reversed in order to lift pans and utensils of different sizes.

Referring by numerals to the accompanying drawings, 1 indicates the handle of my improved pie-lifter, the same being constructed preferably of wood and rectangular in cross-section. Wire arms 2 have their ends 3 passed through the handle 1 and clamped therein, and from said handle extend at right angles thereto and parallel with each other. Adjacent the handle 1 in these wire arms are formed loops 4, and the ends of said arms 2 are formed into loops 5.

The swinging arm or member 6 comprises a single length of wire bent into U-shape and by means of loop 7 formed in its ends is swung or pivoted in the loops 4 in the stationary arms 2. The transverse portion 8 of the swinging member 6 is bent out of the plane occupied by the side portions of said swinging member.

The pivoted member 9 comprises a single length of wire bent into rectangular form and its ends looped together as indicated by 10. By means of loops 11 formed in the sides of the pivoted member 9, said member is pivoted to the loops 5 formed on the ends of the stationary arms 2. The loops 11 are formed to one side of the longitudinal center of the pivoted member 9. Consequently the length of the pivoted member on one side of the loops 11 is somewhat shorter than it is upon the other side.

The ends 12 and 13 of the rectangular pivoted member 9 are bent into planes on opposite sides of the plane occupied by the sides of said rectangular pivoted member. Mounted upon one of the stationary arms is a spiral catch 14 constructed of a single length of wire. This spiral catch is adapted to engage either one of the ends of the side portion of the rectangular pivoted member 9 when the lifter is in practical use.

In the practical use of my improved pie-lifter when it is desired to lift a pie-pan or similar cooking utensil, the operator places the handle with the stationary and swinging members directly over the pie-pan and so manipulates the same as to hook or catch the inwardly bent portion 8 of the swinging member 6 beneath the flange or edge of the pie-pan or utensil. By then slightly rotating the handle and lowering the same, the lower end of the pivoted member 9 which is rigidly held to the stationary arm is hooked or caught beneath the flange or edge of the pie-pan or other utensil directly opposite where the swinging member is hooked or caught. The pan so caught can now be lifted or carried to any point desired. By manipulating the spiral catch 14, the pivoted member 9 may be disengaged from the stationary arm and the position of said pivoted member be reversed. This reversal takes place when differently sized pie-pans and utensils are lifted or moved. Thus it will be seen how I have constructed a pie-lifter that is simple, inexpensive, efficient and capable of being manipulated without bringing the hand or hands of the operator into contact with the pie-pan or the oven.

A pie lifter so constructed is adapted to be so manipulated as that it can be used advantageously upon pie-pans and other like utensils of different sizes.

What I claim is—

1. A pie-lifter, comprising a handle, a pair of arms rigidly secured to said handle, a rectangular member pivoted to the ends of the stationary arms, a U-shaped member swung in loops formed in the stationary arms, and a suitable catch mounted upon one of said stationary arms to engage either end of the pivoted member.

2. A pie-lifter, comprising a handle, a pair of arms rigidly fixed to and extending at right angles to said handle, a rectangular member pivoted in loops formed in the ends of said stationary arms and adapted to be reversed in position, the ends being bent into planes on the opposite sides of the plane occupied by the sides of the pivoted member, a U-shaped member swung from loops formed in the stationary arms, and a spiral-catch mounted upon one of the stationary arms and adapted to engage with either end of the pivoted member.

In testimony whereof I affix my signature in presence of two witnesses.

JOHN E. SHARP.

Witnesses:
 EDWARD E. LONGAN,
 JNO. C. HIGDON.